Aug. 10, 1943.  J. W. GREIG  2,326,533
MOTOR VEHICLE HOOD LOCKING CONSTRUCTION
Filed June 16, 1938  3 Sheets-Sheet 2
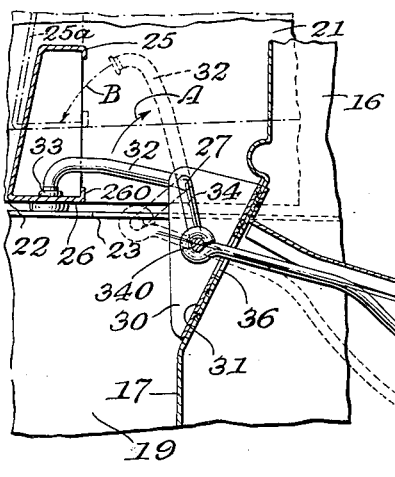
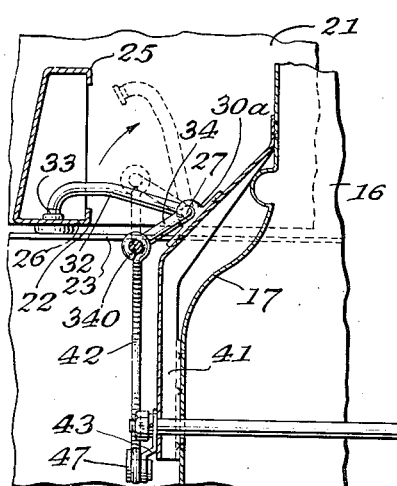
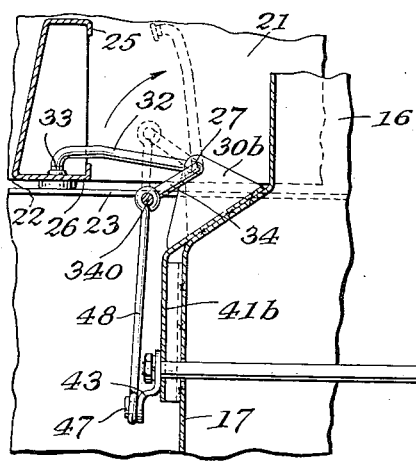
Inventor:
James W. Greig.
By Dyke, Calvert & Gray
Attorneys.

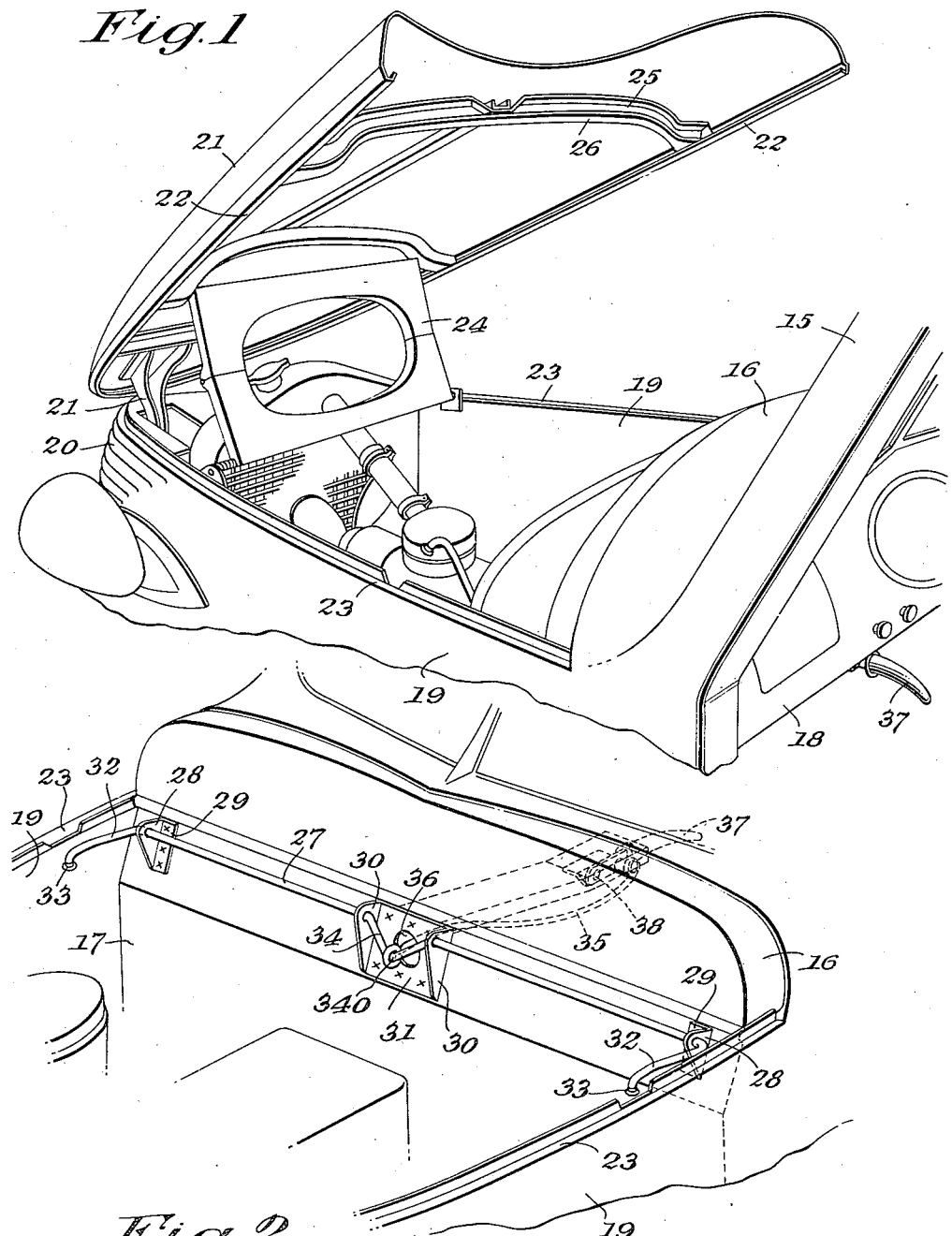

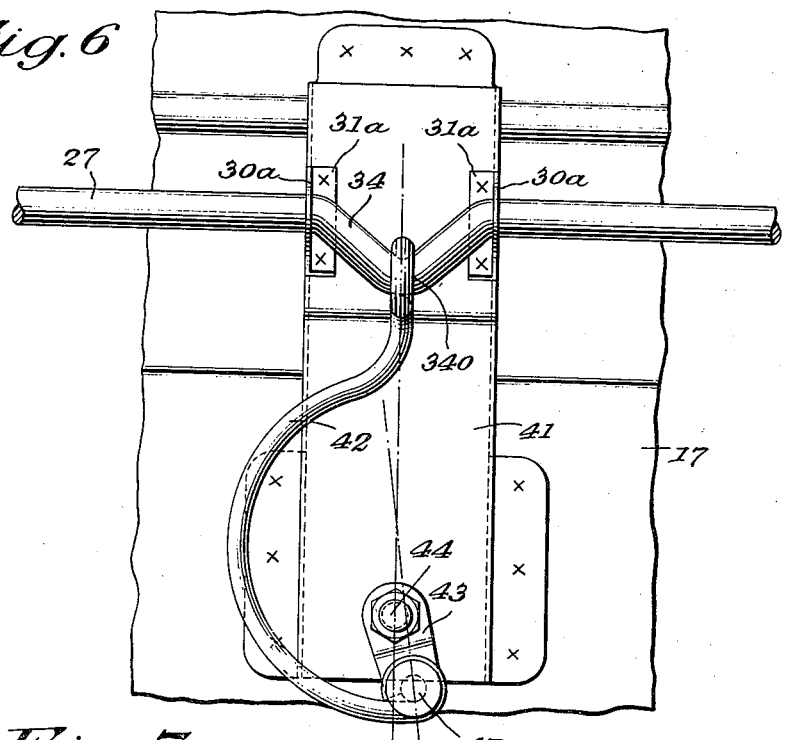
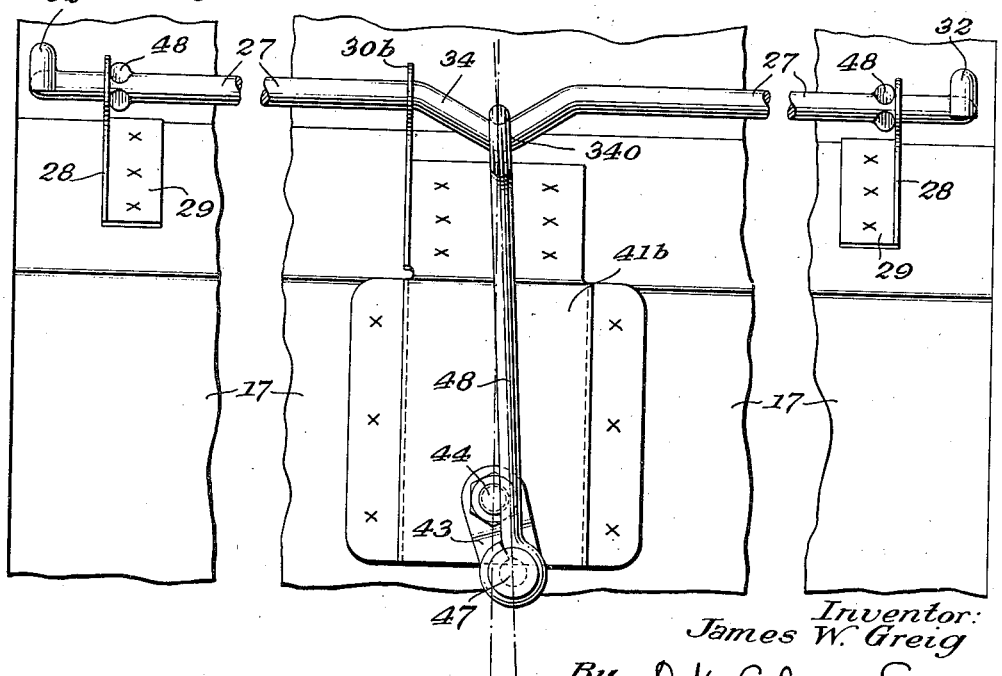

Patented Aug. 10, 1943

2,326,533

UNITED STATES PATENT OFFICE 2,326,533

MOTOR VEHICLE HOOD LOCKING CONSTRUCTION

James W. Greig, Grosse Pointe Park, Mich., assignor to Hudson Motor Car Company, Detroit, Mich., a corporation of Michigan Application June 16, 1938, Serial No. 214,072

6 Claims. (Cl. 292—214)

This invention relates to motor vehicle construction, and particularly to locking mechanism for the usual hood or bonnet which is employed to enclose the motor and associated parts, but which may, when required, be opened to afford access thereto.

The invention has for its general object to provide an improved bonnet locking mechanism which, by engagement with the parts at a plurality of points, will resiliently force the same into and hold them in closed position and will also positively lock said parts against release except by means operable solely from the interior of the vehicle, so as to be inaccessible to unauthorized persons when the doors of the vehicle are locked.

The more particular objects of the invention, together with means whereby the latter may be carried into effect, will best be understood from the following description of certain illustrative embodiments thereof shown in the accompanying drawings, these, however, having been chosen for purposes of exemplification merely, it being obvious that the invention, as defined by the claims hereunto appended, may be otherwise embodied without departure from the spirit and scope thereof.

In said drawings:

Fig. 1 is a fragmentary perspective view of a portion of a motor vehicle looking forward of the vehicle hood.

Fig. 2 is a similar view looking rearward of the vehicle hood and showing the locking mechanism more fully.

Fig. 3 is a fragmentary central longitudinal section through a portion of the vehicle and illustrating the operation of the locking mechanism.

Figs. 4 and 5 are views similar to Fig. 3 showing modifications.

Fig. 6 is a fragmentary front elevation, looking toward the dash, of a portion of the mechanism shown in Fig. 4.

Fig. 7 is a similar view of the mechanism shown in Fig. 5.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In Figs. 1 and 2 is shown a portion of a motor vehicle body including front pillars 15, cowl 16, dash 17, instrument panel 18 and a hood comprising fixed side panels 19 and a forward grille portion 20. Hinged, as at 21, to the fixed portion of the hood is a unitary bonnet member or movable top panel 21 having a bottom flange 22 adapted to close against top flanges 23 on the fixed hood portion and being adapted to be supported in the raised position shown in Fig. 1 by a folding support 24. Adjacent its free end the bonnet member 21 is provided with a cross brace 25 having a bottom flange 26 with which, in the several embodiments of the invention shown, the locking devices cooperate, although it will be obvious that said locking devices might be arranged to cooperate with other parts of the bonnet as, for example, the flanges 22.

The locking mechanism herein shown is generally similar, with some modification, to the mechanism shown in the prior application of Northrup and Greig, filed January 28, 1938, Serial No. 187,346. It comprises a cross shaft or rod 27 rotatably mounted adjacent its ends in ears 28 on brackets 29 and at points adjacent the center of the vehicle in ears 30 on a bracket 31, said brackets being secured as by spot welding to the dash 17. At its ends the shaft 27 carries locking members 32 which may be in the form of separate dogs, as in the application above referred to, secured to the end of the shaft, but are herein shown as integral angular extensions of the shaft and the free ends 33 of which are arranged to engage the bottom flange 26 of the cross member 25 of the bonnet 21, as shown in full lines in Fig. 3. Thus it will be seen that the locking devices are arranged adjacent opposite sides of the bonnet, when closed, and engage the bonnet member 25 at points transversely spaced with respect to the direction of travel of the vehicle. At its intermediate portion, between the ears 30, the shaft 27 is provided with a crank 34 which may be formed by an angular bend in said shaft, or otherwise as desired. The central portion 340 of the crank constitutes the crank pin. The crank pin 340 is connected by a bowed resilient link 35, which passes through registering openings 36 in the bracket 31 and dash 17, with a hand operated toggle lever 37 pivoted at 38 to a bracket 39 secured, as by spot welding, to the under side of the instrument panel 18, the pivotal connection 40 of said link with said lever being eccentric to the pivot 38.

In Fig. 3 the bonnet 21 is shown in full lines in closed and locked position. In order to unlock the same the operating lever 37 is swung forwardly into the dotted line position, thereby causing the link 35 to swing the crank 34 forwardly and raise the locking members 32, as indicated by the full line arrow A, a sufficient distance away from the flange 26 to permit the bonnet to be lifted. When the bonnet is closed, the hand lever 37 is restored to the full line position in Fig. 3, moving the pivot 40 beyond dead center, or beyond the line connecting the pivot 38 with the crank pin 340. This causes the locking members 32 to be returned toward the full line position into engagement with the flange 26. Should the bonnet not be fully closed at either or both sides, causing the cross member 25 to assume the dotted line position 25a in Fig. 3, the locking members in their descent will move in the path indicated by dotted line arrow B into engagement with the flange 26 and tend to draw the same into fully closed position shown in full lines, any obstruction to the complete movement being permitted by the resilience of the link 35 which also effectively holds the parts against rattling. The movement of the parts permitted by the resilience of said link is, however, insufficient to permit disengagement of the locking member 32 from the flange 26, and particularly from the lip 26a with which free edge of said flange is preferably provided, by any movement of the bonnet from the exterior of the vehicle, so that, as the lever 37 is positively locked by the toggle action above described, the bonnet can be released only by deliberate push or pull operation of said lever within the vehicle.

The construction shown in Figs. 4 and 6 is similar to that above described with respect to the shaft 27, locking members 32 and 34. In this construction the ears 30a in which the shaft 27 is journalled intermediate its ends are carried by separate brackets 31a secured to a bracket 41 spot welded or otherwise secured to the dash 17. Also in this construction the crank 34 is pivotally connected to a bowed resilient link 42 which in turn is pivoted at 47 to a toggle lever arm 43 fixed to the forward end of a rock shaft 44 journalled in the bracket 41. The shaft extends through the dash 17 into the vehicle and is journalled adjacent its rear end in a bracket 45 welded or otherwise secured to the under side of the instrument panel 18, said shaft being provided at its extremity with an operating handle 46. The parts are shown in locking position in full lines in Figs. 4 and 6, in which position it will be observed that the point of pivotal connection 47 of the spring link 42 with the arm 43 is beyond the dead center line connecting the axis of the shaft 44 with the crank pin 340, so that the parts can be unlocked only by turning the handle 46 from within the vehicle.

The construction shown in Figs. 5 and 7 is substantially like that shown in Figs. 4 and 6 with the exception that the bowed resilient link 42 is replaced by a straight, substantially rigid link 48, the necessary resilience in the connections being provided by the torsional resilience of the shaft or rod 27. Also in this construction the bracket 41b which corresponds generally to the bracket 41, is provided with a single integral ear 30b in which the shaft 27 is journalled adjacent the crank 34, said shaft being formed with struck up projections 48 engaging the ears 28 to hold said shaft against longitudinal movement.

It will be particularly noted that by virtue of the torsional resilience of cross shaft 27 one locking member 33 is permitted some movement relative to the other locking member. This is important in order to compensate for variations, due for example to manufacturing inaccuracies or tolerances, in the construction of the cooperating parts. If one locking member is slightly higher than the other or one side of the bonnet member 26 is slightly higher than the other side, the locking members will still function together to draw down the bonnet and will at all times have firm engagement with the bonnet since the torsional resiliency of shaft 27 will permit relative yieldable movement of the locking members.

I claim:

1. A locking mechanism for motor vehicle hood constructions having fixed side panels and a movable top panel, said mechanism including a cross shaft having a crank, spaced locking devices on said shaft and simultaneously operable thereby to engage the edges of the top panel and maintain it in closed position on the side panels, an operating member, and a resilient connection between said operating member and crank.

2. In a motor vehicle having a bonnet pivoted at its forward end to permit the rear end to be raised and lowered, a pair of transversely spaced movable locking devices adapted to cooperate with the underside of the rear movable end of the bonnet at transversely spaced points for locking the same, a rock shaft for simultaneously operating said devices, a handle mounted within the interior of the vehicle, and means including a resilient connection for turning the shaft from said handle.

3. In a motor vehicle hood construction having fixed side panels and a bonnet movable relative thereto, a bonnet locking mechanism comprising a cross shaft extending transversely of the hood, upwardly and downwardly swinging bonnet locking members connected to the shaft and arranged to contact means on the underside of the bonnet when in closed position and to exert downward pressure thereon at transversely sepaced points when moved to locking position, an operating member for said shaft mounted interiorly of the vehicle, and means including a resilient connection between said operating member and shaft for turning the latter to move said locking members.

4. In a motor vehicle hood construction having fixed side panels and a bonnet movable relative thereto, a bonnet locking mechanism comprising a cross shaft extending transversely of the hood, upwardly and downwardly swinging bonnet locking members connected to the shaft and arranged to contact means on the underside of the bonnet when in closed position and to exert downward pressure thereon at transversely spaced points when moved to locking position, an operating member for said shaft mounted interiorly of the vehicle, and means between said operating member and shaft for turning the latter to move said locking members for locking and unlocking the bonnet.

5. In a motor vehicle hood construction having fixed side panels and a bonnet movable relative thereto, a bonnet locking mechanism comprising a cross shaft extending transversely of the hood, upwardly and downwardly swinging bonnet locking members mounted directly upon the shaft and arranged to contact means on the underside of the bonnet when in closed position and to exert downward pressure thereon at transversely spaced points when moved to locking position, an operating member for said shaft mounted interiorly of the vehicle, and means including a resilient connection between said operating member and shaft for turning the latter to move said locking members.

6. In a motor vehicle hood construction having fixed upright side panels and a bonnet pivoted at its forward end to swing about a transverse horizontal axis lying in a horizontal plane whereby the rear end of the bonnet is adapted to be raised and lowered, a pair of transversely spaced locking devices cooperable with means on the underside of the rear end of the bonnet at transversely spaced points for locking the same in closed position by drawing down said rear end, an actuating handle mounted within the interior of the vehicle, and means connecting said handle and locking devices for simultaneously actuating the same.

JAMES W. GREIG.